United States Patent [19]
Stricklin et al.

[11] Patent Number: 5,491,598
[45] Date of Patent: Feb. 13, 1996

[54] ROTARY ACTUATOR VIBRATION DAMPER

[75] Inventors: John D. Stricklin, Oklahoma City; John B. Blanks, Edmond, both of Okla.

[73] Assignee: Seagate Technology, Inc., Scotts Valley, Calif.

[21] Appl. No.: 238,907

[22] Filed: May 6, 1994

[51] Int. Cl.$^6$ .............................. G11B 5/55; H02K 5/24; F16C 27/00
[52] U.S. Cl. .............................. 360/106; 310/51; 384/512
[58] Field of Search .............................. 360/106, 98.07, 360/99.04, 99.08; 384/512–514; 464/51, 89, 180, 178; 310/51, 90

[56] References Cited

U.S. PATENT DOCUMENTS

| | | | |
|---|---|---|---|
| 3,713,121 | 1/1973 | Fasano et al. | 340/174.1 |
| 3,769,467 | 10/1973 | Gabor | 179/100.2 |
| 3,936,881 | 2/1976 | Orlando et al. | 360/103 |
| 4,144,466 | 3/1979 | Hatch | 310/13 |
| 4,208,684 | 6/1980 | Janssen et al. | 360/104 |
| 4,408,238 | 10/1983 | Hearn | 360/104 |
| 4,471,248 | 9/1984 | Smetana | 310/51 |
| 4,933,792 | 6/1990 | Sleger et al. | 360/106 |
| 4,993,851 | 2/1991 | Nakanishi | 384/512 |
| 5,235,227 | 8/1993 | Fazekas | 310/51 |
| 5,251,085 | 10/1993 | Morris et al. | 360/98.01 |

*Primary Examiner*—Robert S. Tupper
*Assistant Examiner*—George J. Letscher
*Attorney, Agent, or Firm*—Westman, Champlin & Kelly

[57] ABSTRACT

A bearing assembly supports an actuator arm for rotation about an axis in a disc drive. The bearing assembly includes a shaft generally defining the axis. A plurality of bearings are disposed about the shaft. A sleeve is coupled to the bearings for rotation about the shaft, and a damper is coupled to the sleeve. The damper damps rotary actuator vibrations.

17 Claims, 5 Drawing Sheets

ROTARY ACTUATOR VIBRATION DAMPER

BACKGROUND OF THE INVENTION

The present invention relates to disc drives. More particularly, the present invention relates to damping vibrations which occur in a rotary actuator in a disc drive.

A typical magnetic disc drive includes one or more magnetic discs, a transducer supported by a hydrodynamic air bearing which flies above each magnetic disc, and a drive controller for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the transducer radially over the disc surface for track seek operations and holds the transducer directly over a track on the disc surface for track following operations.

Information is typically stored on the magnetic discs by providing a write signal to the transducer to encode flux reversals on the surface of the magnetic disc representing the data to be stored. In retrieving data from the disc, the drive controller controls the electromechanical actuator so that the transducer flies above the magnetic disc, sensing flux reversals on the magnetic disc and generating a read signal based on those flux reversals. The read signal is then decoded by the drive controller to recover the data represented by the flux reversals stored on the magnetic disc, and consequently represented in the read signal provided by the transducer.

Conventionally, the electromechanical actuator includes an actuator arm assembly which is coupled to a head gimbal assembly (which includes the transducer and hydrodynamic air bearing). The actuator arm assembly is controlled to pivot or rotate about a shaft generally defining an axis of rotation to move the head gimbal assembly over the surface of the disc to a desired radial position. The actuator arm assembly typically includes a sleeve rotatably mounted about the shaft by a pair of bearings. The sleeve is coupled to an actuator arm and a voice coil which is connected to the actuator arm. A magnet, or group of magnets, is positioned relative to the voice coil such that when the disc drive controller causes current to flow through the voice coil, the fields generated by the voice coil interact with the magnetic field provided by the magnets and cause rotation of the actuator arm assembly about the shaft.

Such actuator arm assemblies are movable between two extreme positions. In the first extreme position, the actuator arm assembly is positioned to hold the hydrodynamic air bearing over the innermost radius of the magnetic disc. In the second extreme position, the actuator arm assembly is positioned to hold the hydrodynamic air bearing over the outermost radius of the disc.

The ball bearings which rotatably mount the sleeve to the shaft in the actuator arm assembly have an associated radial stiffness which is typically far less than infinity. Thus, the actuator arm assembly is vulnerable to vibrations at a resonance determined principally by the ratio of the bearing radial stiffness to dead weight of the mass supported by the bearings. In disc drives, the dead weight of the actuator arm assembly is typically made as low possible. Therefore, in order to remove the resonant frequency of vibrations from the bandwidth of the servo system, bearings of high radial stiffness are required. However, increasing the radial stiffness of the bearings requires a higher bearing pre-load which increases bearing resistance (or rotational friction) and decreases bearing life. As the actuator arm assembly is rotated between the two extreme positions, in-plane vibration can occur. This vibration occurs in the actuator arm assembly substantially in a plane parallel to the plane defined by the magnetic disc.

SUMMARY OF THE INVENTION

The present invention includes a bearing assembly for supporting an actuator arm for rotation about an axis in a disc drive. The bearing assembly includes a shaft generally defining the axis. A plurality of bearings are disposed about the shaft, and a sleeve is coupled to the bearings for rotation about the shaft. A damper is coupled to the sleeve to damp vibrations of the rotary actuator.

In one preferred embodiment, the shaft has an external surface and the sleeve has an inner surface generally facing the external surface of the shaft. The damper includes a damping material coupled to the inner surface of the sleeve. The damper also includes a damping member coupled to the damping material within the inner portion of the sleeve.

DETAILED DESCRIPTION OF THE PREFERRED EMBODIMENTS

Figure 1:
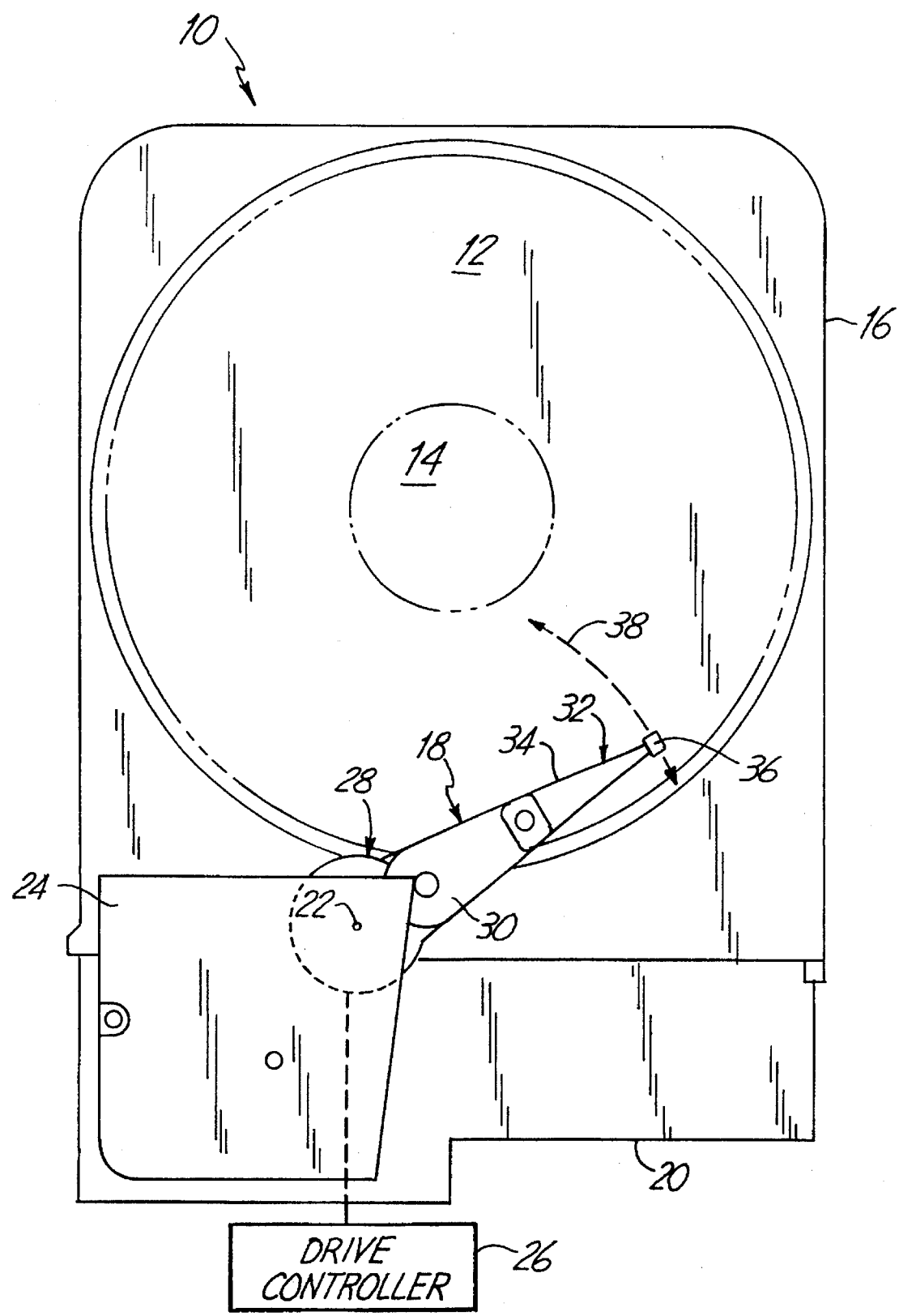
FIG. 1 is a top view of a disc drive.

FIG. 1 is a top view of a disc drive 10 of the present invention. Disc drive 10 includes a magnetic disc 12 mounted for rotational movement about an axis defined by spindle 14 within housing 16. Disc drive 10 also includes a stacked actuator system 18 mounted to a base plate 20 of housing 16 and pivotally movable relative to disc 14 about axis 22.

A cover 24 covers a portion of stacked actuator system 18. Drive controller 26 is coupled to stacked actuator system 18. In the preferred embodiment, drive controller 26 is either mountable within disc drive 10, or is located outside of disc drive 10 with suitable connection to stacked actuator system 18.

In a preferred embodiment, stacked actuator system 18, which will be described in greater detail later in the specification, includes an actuator arm assembly 28, a rigid support member 30, and a head gimbal assembly 32. Head gimbal assembly 32 includes a load beam or flexure arm 34 coupled to rigid member 30, and a hydrodynamic air bearing (a slider) coupled by a gimbal (not shown) to load beam 34. Slider 36 supports a transducer for reading information from disc 12 and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to stacked actuator system 18. The position signal causes stacked actuator system 18 to pivot or rotate about axis 22. This, in turn, causes slider 36 (and consequently the transducer mounted on slider 36) to move radially over the surface of disc 12 in a generally arcuate path indicated by arrow 38. Drive controller 26 and stacked actuator system 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
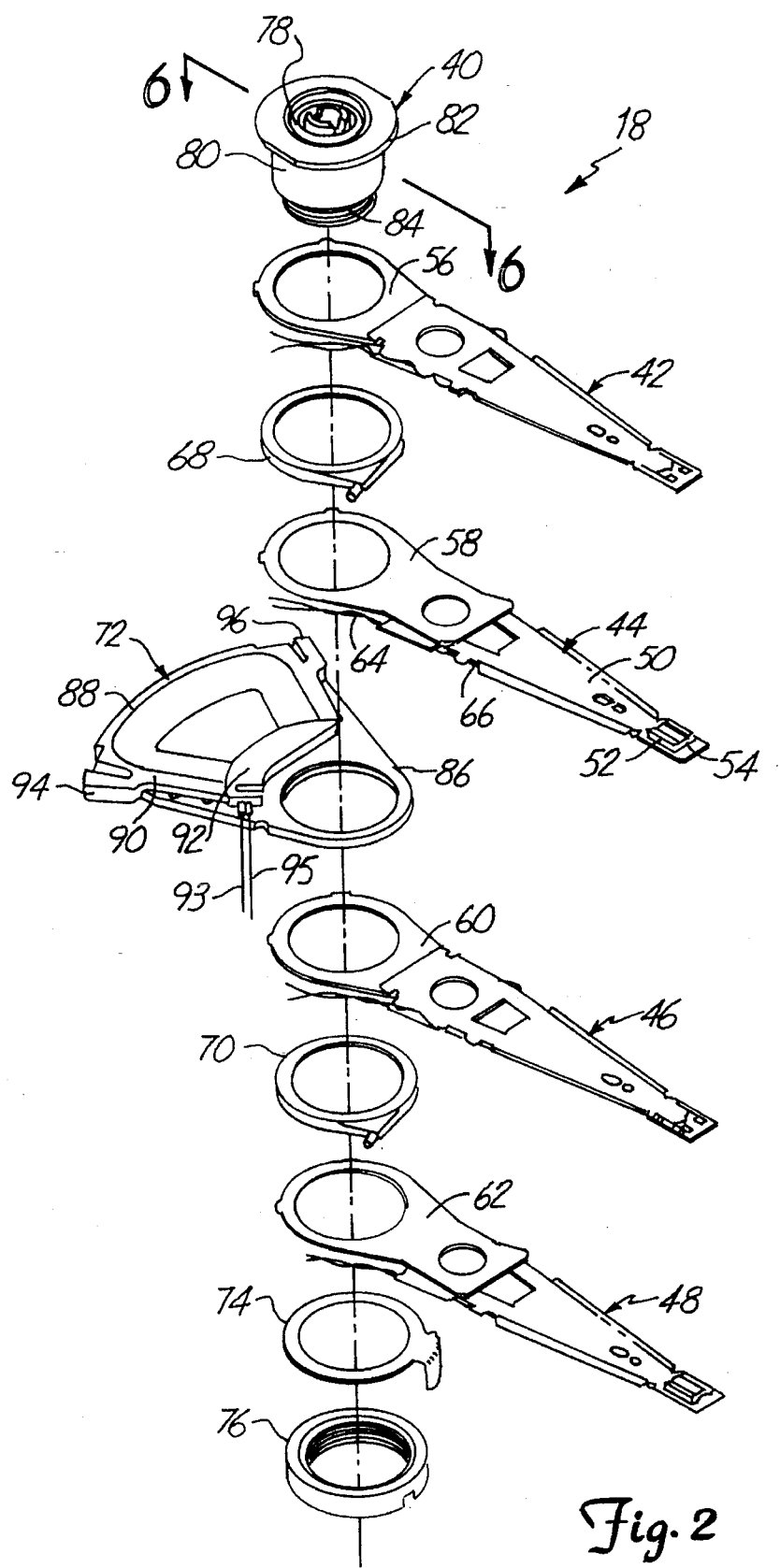
FIG. 2 is an exploded view of a stacked actuator assembly.

FIG. 2 is an exploded view of stacked actuator system 18. The particular stacked actuator system 18 shown in FIG. 2 is used in a disc drive having two discs. Stacked actuator system 18 includes bearing assembly 40, a plurality of head gimbal assemblies 42, 44, 46, and 48, each including a load beam 50, a gimbal (not shown), a slider 52 and a transducer 54. For the sake of simplicity, these items are only numbered on head gimbal assembly 44. Each of the head gimbal assemblies is coupled to a support member 56, 58, 60 and 62, respectively.

Each of the head gimbal assemblies 42, 44, 46, and 48 also have conductors 56 coupled within a conductor sleeve 58, and connected to transducer 54. The conductors are coupled to appropriate signal conditioning circuitry and the conditioned signals are provided to drive controller 26.

Stacked actuator system 18 also includes a pair of spacers 68 and 70. Spacer 68 is coupled between support members 56 and 58 and spacer 70 is coupled between support members 60 and 62. Stacked actuator system 18 further includes actuator arm assembly 72, hook ring 74 and nut ring 76.

Bearing assembly 40 includes an interior shaft 78 and an exterior sleeve 80. The exterior surface of shaft 78, and the interior surface of sleeve 80 are mounted to bearing races which are separated by ball bearings. In the preferred embodiment, two sets of bearing races axially spaced from one another along shaft 78 are provided with ball bearings, commonly nine balls per set of races. Sleeve 80 includes a flange 82 which is disposed annularly about an upper portion of sleeve 80.

During assembly, all of the items comprising stacked actuator assembly 18 are placed over sleeve 80 to abut flange 82 in the order shown in FIG. 2. Nut ring 76 has a threaded interior surface that threadably mates with a threaded exterior end portion 84 of sleeve 80. After all the items comprising system 18 are placed onto sleeve 80, nut ring 76 threadably engages end 84 to secure the parts of system 18 together.

FIG. 2 shows that actuator arm assembly 72 includes an actuator arm 86, a voice coil 88, an overmold 90, and a spacer 92. Actuator arm 86 is typically an aluminum arm. Voice coil 88 is a conventional voice coil formed of appropriate conductors and used in positioning system 18. Overmold 90 is a plastic overmolding which connects voice coil 88 to actuator arm 86. The plastic overmold 90 is melted to flow over voice coil 88, attaching it to actuator arm 86 in a known manner.

FIG. 2 also shows that actuator arm assembly 72 includes crash stops 94 and 96. In the preferred embodiment, crash stops 94 and 96 are formed integrally with overmold 90 and extend from generally opposing edges defining the perimeter of actuator arm assembly 72.

Cables 93 and 95 are connected to voice coil 88 and to drive controller 26 to control movement of system 18. Spacer 92 provides a strain relief for the connection of cables 93 and 95 to voice coil 88.

Figure 3:
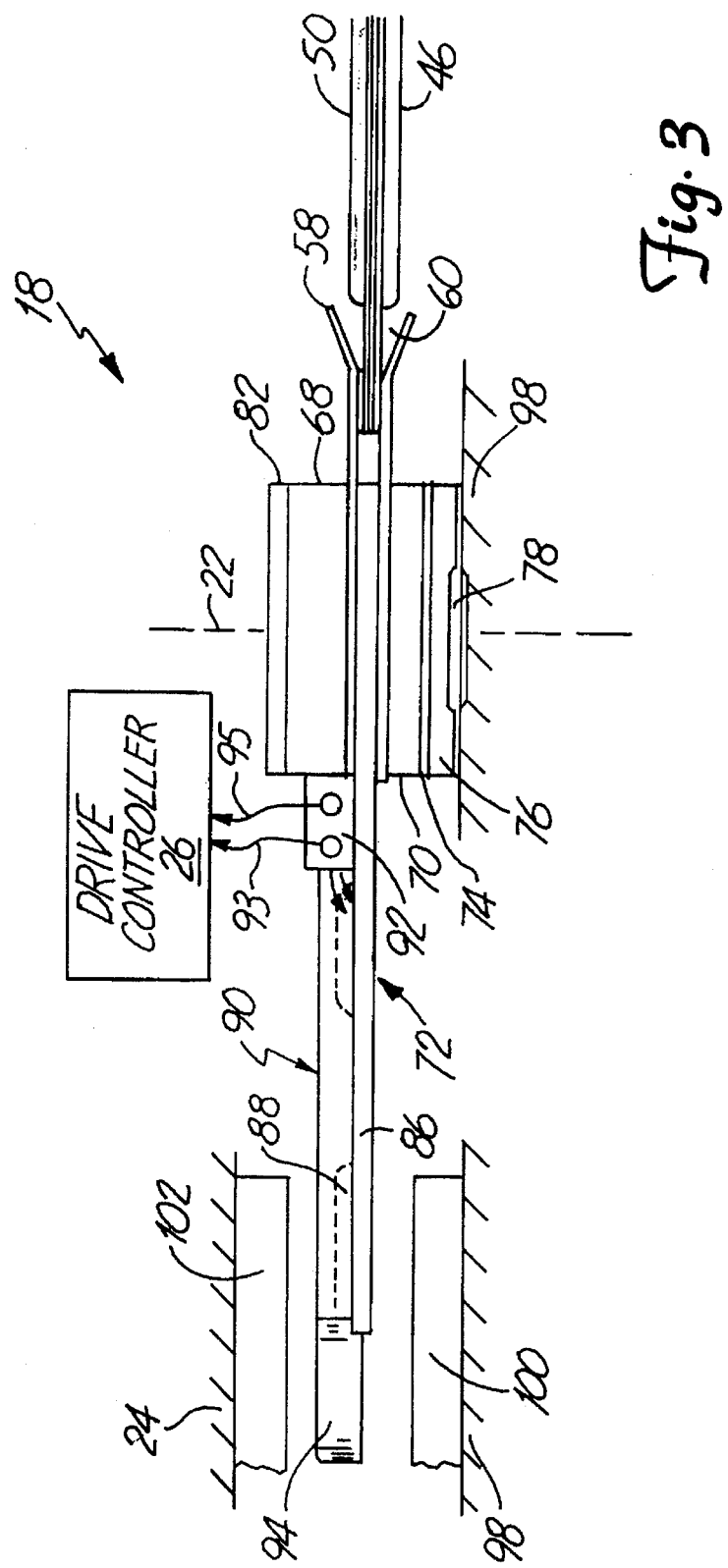
FIG. 3 is a side view of an assembled stacked actuator system.

FIG. 3 shows a side view of system 18 assembled. For the sake of clarity, system 18 shown in FIG. 3 includes only head gimbal assemblies 44 and 46 and support members 58 and 60. Head gimbal assemblies 42 and 48 and support members 56 and 62 are eliminated. Similar items are similarly numbered to those shown in FIG. 2.

Shaft 78 of bearing assembly 40 is rigidly coupled to a base plate 98 of housing 16 in disc drive 10. Thus, actuator arm assembly 72 is pivotable with respect to base plate 98 about axis 22. FIG. 3 schematically shows conductors 93 and 95 coupled to drive controller 26. A pair of magnets 100 and 102 are coupled to base plate 98 and cover portion 24 of housing 16. A portion of voice coil 88, shown in phantom in FIG. 3, is positioned between magnets 100 and 102. Therefore, as drive controller 26 provides a signal via conductors 93 and 95 to voice coil 88, the magnetic fields from magnets 100 and 102 interact with voice coil 88 to produce movement of actuator arm assembly 72 (and correspondingly head gimbal assemblies 46 and 50) about axis 22.

A stacked actuator system 18, such as that shown in FIG. 3, typically encounters in-plane vibration (i.e., in a plane normal to the page of FIG. 3) during operation. Vibration occurs when the stacked actuator system vibrates on the bearings which couple sleeve 80 to shaft 78. The ball bearings have an associated radial stiffness which is much less than infinity. This allows the actuator system to be vulnerable to a resonance determined primarily by the ratio of the bearing radial stiffness to the dead weight of the actuator system supported by the bearings. Such a resonance is difficult to directly dampen out of the system because such actuator systems typically require low rotational friction in the ball bearings.

Figure 4:
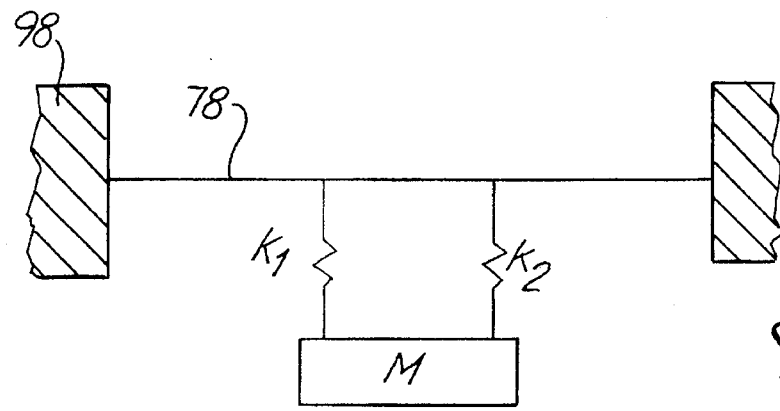
FIG. 4 is a schematic representation of a stacked actuator system.

The nature of the resonance is illustrated in FIG. 4. FIG. 4 shows the dead weight of the actuator system supported by the ball bearings as having a mass M. This mass corresponds to the mass of the rotating portion of the actuator system shown in FIGS. 2 or 3. As mentioned with respect to FIGS. 2 and 3, the sleeve 80 is typically coupled to the shaft 78 by a pair of ball bearings spaced axially along shaft 78. Constants $k_1$ and $k_2$ in FIG. 4 represent the bearing radial stiffness of the first and second ball bearings, respectively.

It has been observed that, in using bearings with a practical radial stiffness, vibrations with a resonance typically around 2000 Hertz are common in the actuator system. This resonance is particularly troublesome because it is within the bandwidth of operation of the servo system. Thus, excessive actuator arm vibration is seen by the closed loop servo system as head position error, and the drive controller 26 attempts to correct for the error. The correction signal is typically nearly the same as the frequency of the vibration. However, delays in the servo system can result in correction signals that amplify, rather than attenuate, the resonance. This can lead to erroneous head positioning which results in excessive and sometimes uncorrectable errors. Further, the resonances which occur in the actuator system are typically in the audio bandwidth, resulting in high-pitch ringing sounds.

Figure 5:
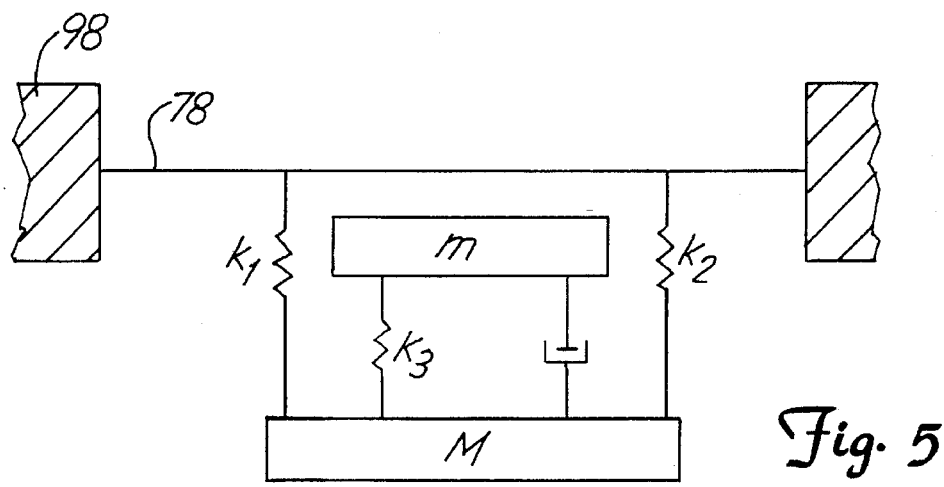
FIG. 5 is a schematic representation of a stacked actuator system including a tuned mass damper according to the present invention.

FIG. 5 is a schematic diagram of a tuned mass damper according to the present invention. The embodiment shown in FIG. 5 includes an auxiliary damping mass m connected to the dead weight represented by mass M by a material having its own radial stiffness represented by $k_3$. Auxiliary mass m, when connected by the damping material, serves to dampen in-plane vibrations occurring in the actuator system. In the preferred embodiment, in order to dampen the particular vibrations of interest auxiliary mass m is mounted in an orientation perpendicular to a line drawn from the center of the actuator through the center of the head or slider 36 shown in FIG. 1.

Figure 6:
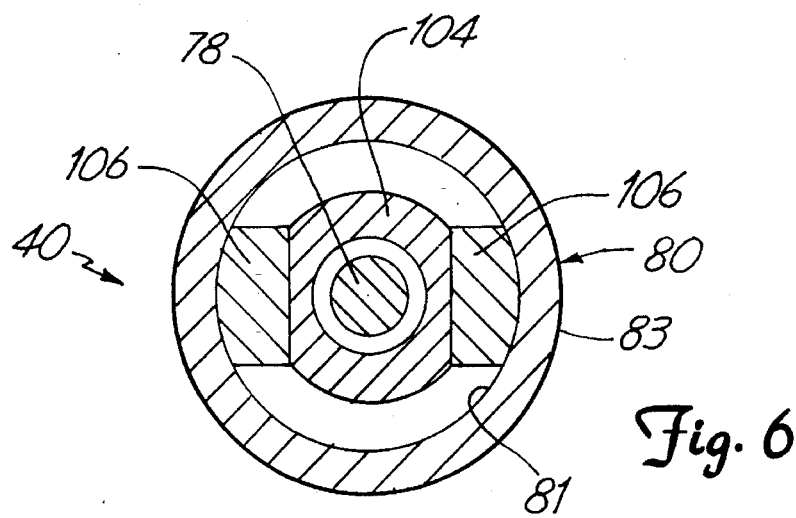
FIG. 6 is a cross-sectional view of a sleeve taken along section lines 6—6 of FIG. 2.

FIG. 6 is a sectional view of bearing assembly 40 taken along section line 6—6 in FIG. 2. Bearing assembly 40 includes sleeve 80 which has an inner surface 81 and an outer surface 83. Auxiliary member 104 is disposed on the interior of sleeve 80 and is coupled to the inner surface 81 of sleeve 80 by a damping material 106. Auxiliary member 104 has a mass m. Damping material 106 has a radial stiffness $k_3$. Both $k_3$ and m are chosen to reduce the rotary vibrations which occur in the actuator system.

In the preferred embodiment, auxiliary member 104 is a ring or sleeve of material such as brass having a mass m which is as large as reasonably possible. With a mass m of approximately 10% of the dead weight M supported by the bearings, significant damping occurs. It has also been observed that an mass m of 5% of the dead weight M provided a significant reduction in vibration. In addition, damping material 106 is preferably a viscoelastic material such as the materials manufactured by Minnesota Mining and Manufacturing (3M) of St. Paul, Minn. under the commercial designations ISD 112 or ISD 113. These materials are more fully described in U.S. Pat. No. 4,447,493 to Driscoll, which is hereby fully incorporated by reference. These commercially available materials have adhesive portions which are suitable for connecting material 106 to the inner surface 81 of sleeve 80 and to damping member (or auxiliary member) 104.

Figure 7:
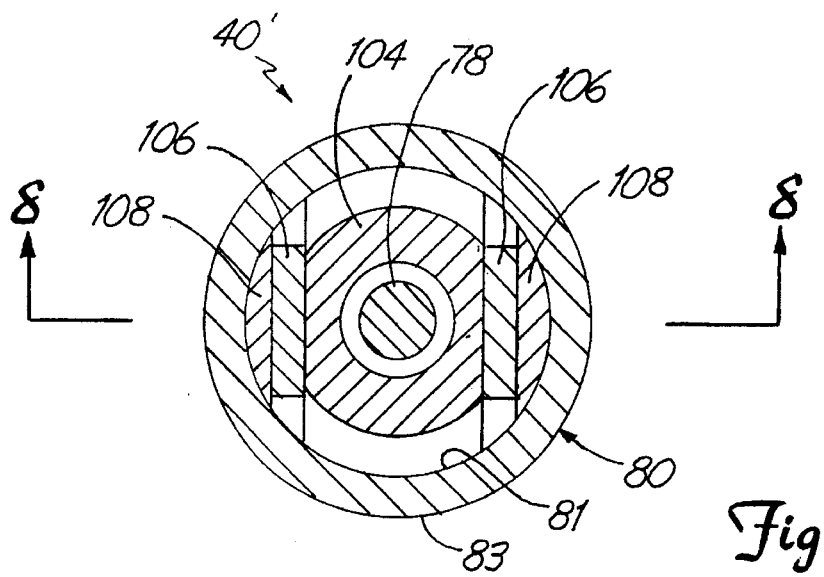
FIG. 7 is a cross-sectional view of a second embodiment of a sleeve according to the present invention.

FIG. 7 is a cross-sectional view of an alternative bearing assembly 40' according to the present invention. Similar items in FIGS. 6 and 7 are similarly numbered. Bearing assembly 40' includes auxiliary member 104 and damping material 106. However, in the embodiment shown in FIG. 7, damping material 106 is not directly attached to the interior surface 81 of sleeve 80. Rather, spacers 108 are adapted to the contour of the inner surface 81 of sleeve 80. Spacers 108 are also provided with an interior surface which forms a flat mounting surface to which damping material 106 is adhered. In the preferred embodiment, spacers 108 are coupled to the interior surface 81 of sleeve 80 by any suitable, commercially available adhesive. Also, in the preferred embodiment, spacers 108 are formed of suitable material, such as plastic.

Figure 8:
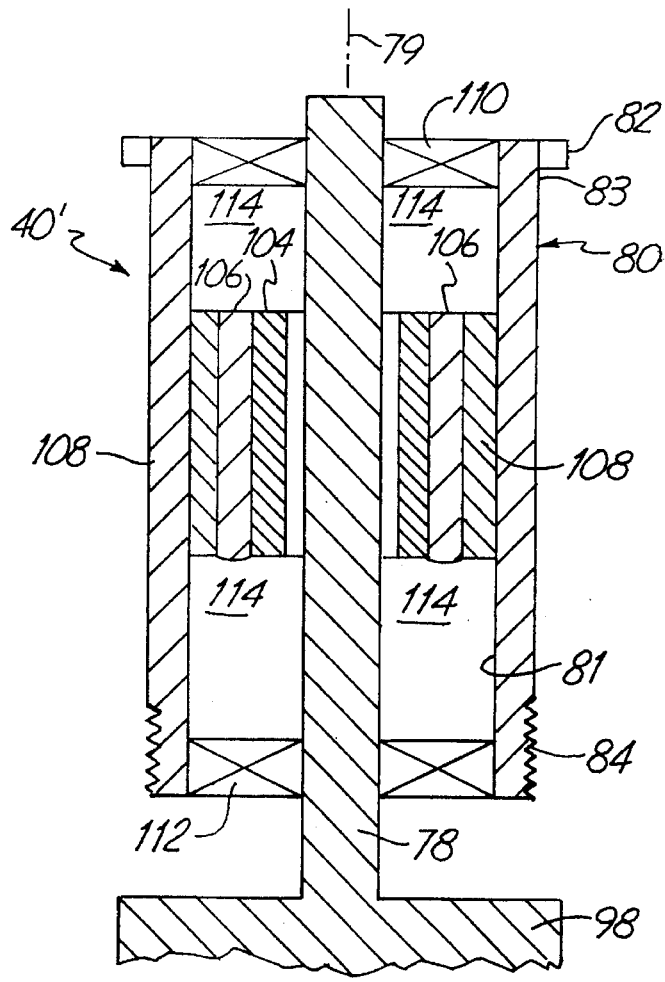
FIG. 8 is a cross-sectional view of the sleeve shown in FIG. 7, taken along section lines 8—8.

FIG. 8 is a cross-sectional view of bearing assembly 40' taken along section lines 8—8 in FIG. 7. FIG. 8 shows a first set of bearings 110 and a second set of bearings 112 which are axially spaced from one another along shaft 78 and which mount sleeve 80 in rotatable relation to shaft 78.

Bearings 110 and 112, and the inner surface 81 of sleeve 80, define an inner chamber 114 in bearing assembly 40'. In the preferred embodiment, auxiliary member 104, damping material 106, and spacers 108 are mounted to the inner surface 81 of sleeve 80 in inner chamber 114, between bearings 110 and 112. This mounting arrangement provides significant advantages. By symmetrically locating the items about shaft 78, the system has little or no effect on the balance of the actuator system as it rotates about shaft 78. The moment of inertia about the axis of rotation 79 defined generally by the radial center of shaft 78 is least affected by such a placement. Further, by locating the damper on the interior of sleeve 80, the arrangement minimizes any deleterious effects which the damper may have on the rotational characteristics of the actuator assembly.

In sum, the present invention provides a damper for damping in-plane mode vibrations in a rotary actuator system. In the preferred embodiment, the damper is a tuned mass damper which is mounted to the sleeve of the actuator assembly at the internal surface of the sleeve. This facilitates the retention of balance in the actuator system, and reduces any negative effects which the weight of the damper may have on the actuator system. Thus, the present invention significantly enhances drive characteristics by damping unwanted vibration, without introducing other sources of error and performance degradation.

It should be noted that, while the present description is provided for a system having two magnetic discs, the damper of the present invention offers significant improvement in systems having a different number of discs, and discs of different size than those described herein.

Although the present invention has been described with reference to preferred embodiments, workers skilled in the art will recognize that changes may be made in form and detail without departing from the spirit and scope of the invention.

What is claimed is:

1. An actuator system for moving a head gimbal assembly relative to a disc in a disc drive, the actuator system comprising:

an actuator providing a driving force;

an actuator assembly movable by the actuator and coupled to the head gimbal assembly for moving the head gimbal assembly relative to the disc in response to the driving force provided by the actuator; and wherein the actuator assembly includes:

a shaft having an outer surface, the shaft generally defining an axis of rotation;

a sleeve having an inner surface, the sleeve disposed about the shaft;

bearing means, disposed about the shaft, for rotatably mounting the sleeve to the shaft;

an actuator arm coupled to the sleeve for rotation with the sleeve and for supporting the head gimbal assembly, the actuator arm having a first major surface generally defining a plane; and a damper having a damping member and a damping material coupled to the damping member, the damping material coupled to the sleeve and disposed therein, for damping vibrations of the actuator arm in the plane defined by the actuator arm.

2. The actuator system of claim 1 wherein the inner surface of the sleeve and the outer surface of the shaft generally define a chamber, and wherein the damper is coupled to the sleeve within the chamber.

3. The actuator system of claim 2 wherein the inner surface of the sleeve comprises a spacer attached to the damping material and coupling the damper to the inner surface of the sleeve.

4. An actuator assembly for supporting a head gimbal assembly in a disc drive, the actuator assembly comprising:

a baseplate;

a shaft having an external surface and coupled to the baseplate;

a sleeve having an inner surface and disposed about the shaft such that the inner surface generally faces the external surface of the shaft;

a bearing disposed about the shaft and rotatably mounting the sleeve to the shaft;

an actuator arm coupled to the sleeve for rotation with the sleeve and for supporting the head gimbal assembly, the actuator arm having a first major surface generally defining a plane; and damper coupled to the sleeve generally between the sleeve and the shaft, the damper having a damping material coupled to the inner surface of the sleeve and a damping member, having a damping mass, coupled to the damping material and spaced-apart from the shaft for damping vibrations of the actuator arm in the plane defined by the actuator arm.

5. The actuator assembly of claim 1 wherein the damping material comprises:

a viscoelastic material.

6. The actuator assembly of claim 4 wherein the damping material includes an adhesive for adhering the viscoelastic material to the inner surface of the sleeve and for adhering the viscoelastic material to the damping member.

7. The actuator assembly of claim 1 wherein the damping member comprises:

a ring disposed about the external surface of the shaft and coupled to the inner surface of the sleeve at a plurality of areas by the damping material.

8. The actuator assembly of claim 1 and further comprising:

a spacer for coupling the damping material to the inner surface of the sleeve.

9. The actuator assembly of claim 1 wherein the bearing supports a dead weight for rotation about the shaft, and wherein the damping mass is in a range of approximately five percent (5%) to ten percent (10%) of the dead weight supported by the bearing.

10. The actuator assembly of claim 1 wherein the bearing comprises:

a first bearing member disposed about the shaft; and a second bearing member disposed about the shaft, the first and second bearing members being axially spaced from one another along the shaft, and wherein the damper is coupled to the inner surface of the sleeve and located at an axial position along the shaft between the first and second bearing members.

11. A bearing assembly in a rotary actuator for supporting an actuator arm for rotation about an axis in a disc drive, the bearing assembly comprising:

a shaft generally defining the axis;

a plurality of bearings disposed about the shaft;

a sleeve having an inner surface coupled to the bearings for rotation about the shaft; and a damper coupled to the inner surface of the sleeve for rotation therewith, the damper including a damping material coupled to the inner surface of the sleeve and a damping member, having a damping mass and an outer surface generally facing the inner surface of the sleeve, coupled to the damping material at the outer surface and spaced apart from the shaft for damping vibrations of the rotary actuator.

12. The bearing assembly of claim 10 wherein the damping material comprises:

a viscoelastic material.

13. The bearing assembly of claim 12 wherein the damping material includes an adhesive for adhering the viscoelastic material to the inner surface of the sleeve and for adhering the viscoelastic material to the damping member.

14. The bearing assembly of claim 10 wherein the damping member comprises:

a ring disposed about the external surface of the shaft and coupled to the inner surface of the sleeve at a plurality of areas by the damping material.

15. The bearing assembly of claim 10 and further comprising:

a spacer for coupling the damping material to the inner surface of the sleeve.

16. The bearing assembly of claim 10 wherein the plurality of bearings support a dead weight for rotation about the shaft, and wherein the damping mass is in a range of approximately five percent (5%) to ten percent (10%) of the dead weight supported by the plurality of bearings.

17. The bearing assembly of claim 10 wherein the plurality of bearings comprise:

a first bearing member disposed about the shaft; and a second bearing member disposed about the shaft, the first and second bearing members being axially spaced from one another along the shaft, and wherein the damper is coupled to the inner surface of the sleeve and located at an axial position along the shaft between the first and second bearing members.

\* \* \* \* \*